United States Patent [19]

Sheppard

[11] Patent Number: 4,665,746
[45] Date of Patent: May 19, 1987

[54] LIQUID LEVEL MEASURING APPARATUS AND METHOD

[76] Inventor: William J. Sheppard, 36655 Romulus Rd., Romulus, Mich. 48174

[21] Appl. No.: 755,918

[22] Filed: Jul. 17, 1985

[51] Int. Cl.$^4$ .................. G01F 23/00; G11F 23/14
[52] U.S. Cl. .................. 73/302; 137/625.46; 137/637.4
[58] Field of Search .......... 73/302, 299; 137/557, 137/558, 625.46, 637.4

[56] References Cited

U.S. PATENT DOCUMENTS

| | | |
|---|---|---|
| 1,131,412 | 3/1915 | Parks . |
| 1,303,290 | 5/1919 | Gibbs . |
| 1,431,516 | 10/1922 | Fox . |
| 2,001,853 | 5/1935 | Seward .................. 73/302 |
| 2,427,690 | 9/1947 | Peterson ................ 73/302 |
| 2,518,484 | 8/1950 | Matthews ............... 73/302 |
| 2,581,427 | 1/1952 | Matthews ............... 73/302 |
| 2,888,098 | 5/1959 | Florence ............... 137/637.4 |
| 2,942,466 | 6/1960 | Barron et al. . |
| 3,475,959 | 11/1969 | Glassey . |
| 3,620,085 | 11/1971 | Khoi .................... 73/302 |
| 3,688,577 | 9/1972 | Murphy ................. 73/299 |
| 3,777,698 | 12/1973 | Hunter . |
| 3,782,323 | 1/1974 | Jones ................... 73/302 |
| 3,834,236 | 9/1974 | Durin . |
| 4,006,636 | 2/1977 | Holmen . |
| 4,064,752 | 12/1977 | Murphy ................. 73/302 |
| 4,145,926 | 3/1979 | Martig, Jr. . |
| 4,199,983 | 4/1980 | Kobayashi et al. . |
| 4,326,671 | 4/1982 | Goguen ................. 137/625.46 |
| 4,480,610 | 11/1984 | Stinson ................ 73/302 |

OTHER PUBLICATIONS

"The Original Precision Tank Measuring System!" taken from Power and Motor Yacht, Aug. 1985, p. 127, by Hart Systems, Inc.

Primary Examiner—Charles Frankfort
Assistant Examiner—Denis E. Corr
Attorney, Agent, or Firm—Harness, Dickey & Pierce

[57] ABSTRACT

There is disclosed an apparatus of the bubble type for accurately measuring the quantity of liquid in a tank. The apparatus functions by supplying an accurately measured quantity of purge gas at an accurately controlled predetermined pressure and flow rate through a selector valve to a tube extending to the bottom of any one of a number of liquid-containing tanks to be monitored. When the apparatus is actuated, purge gas first clears the tube of substantially all liquid originally disposed therein and then stabilizes at a pressure which accurately reflects the liquid depth in the tank. A method of making such measurements is also disclosed.

30 Claims, 7 Drawing Figures

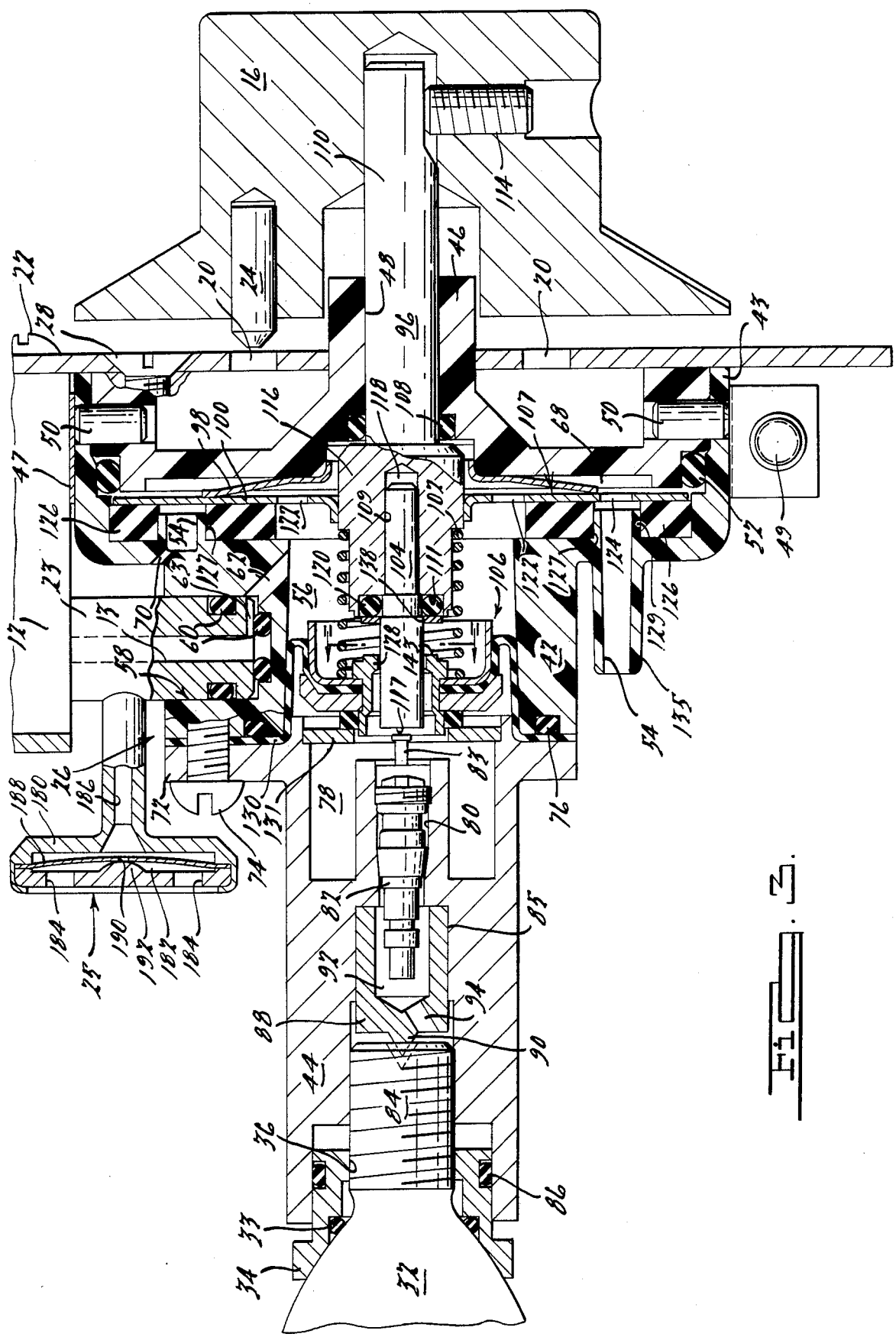

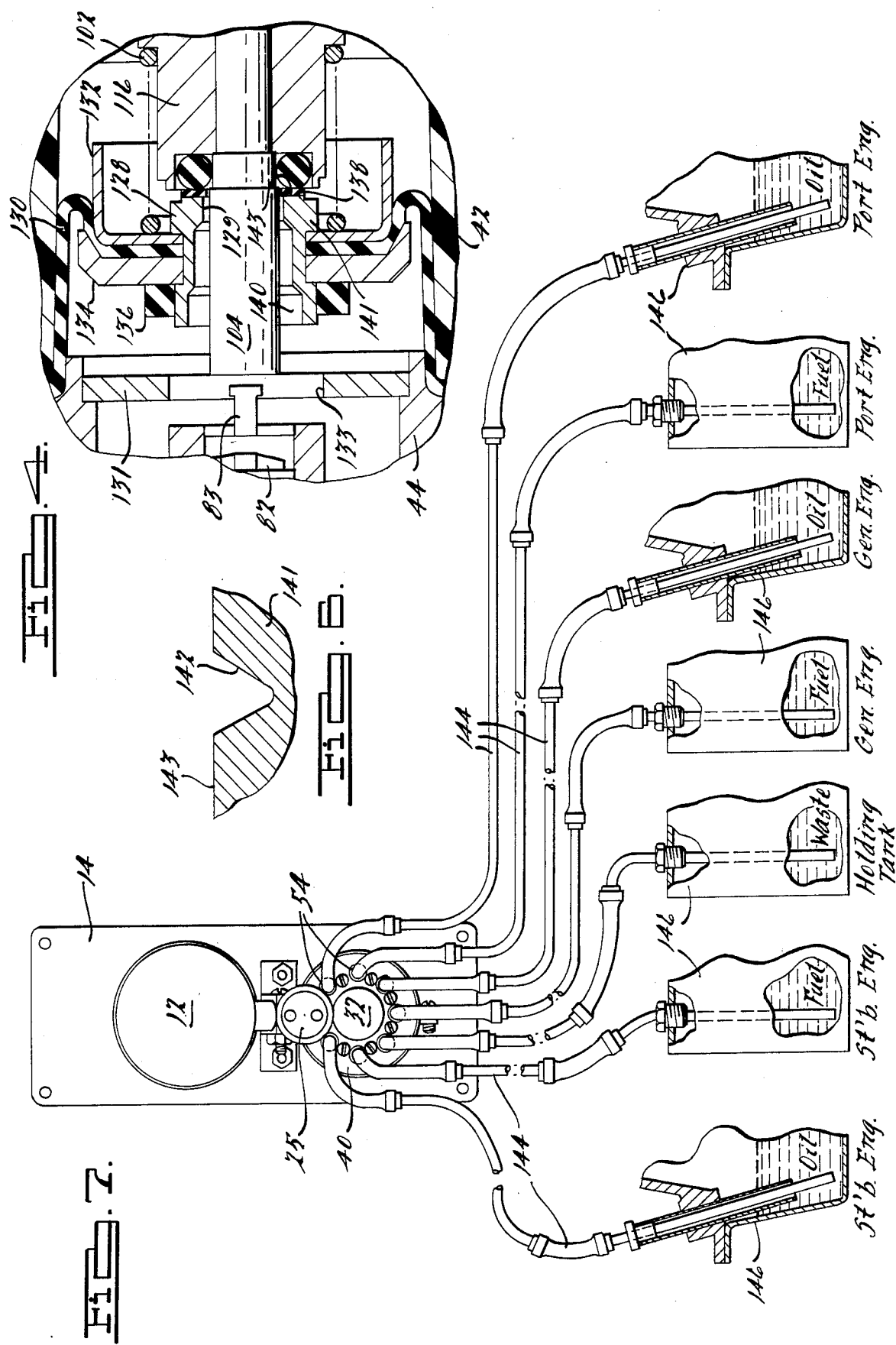

LIQUID LEVEL MEASURING APPARATUS AND METHOD

BACKGROUND AND SUMMARY OF THE INVENTION

The present invention relates generally to liquid level measuring devices, and particularly those of the bubble tube type.

The present invention resides in the provision of a unique bubble tube type measuring device which overcomes the well-known disadvantages of float type measuring devices (i.e., expense, reliability, accuracy, etc.), which is extremely reliable and accurate in operation and yet is very easy to use, and which is capable of selectively monitoring almost any number of liquid-containing tanks, regardless of the viscosity of the liquid therein.

The apparatus functions by supplying an accurately measured quantity of purge gas at an accurately controlled predetermined pressure and flow rate through a selector valve to a tube extending to the bottom of any one of a number of liquid-containing tanks to be monitored. The purging is done in two stages to increase the speed of operation. When the device is actuated, the first stage of purge gas is at a relatively high pressure and flow rate for intially clearing the tube of substantially all liquid originally disposed therein, and the second stage of purge gas is a fixed volume is at a lower pressure and flow rate (which is constant) for stabilizing the system at a pressure which accurately reflects the liquid depth in the tank. The device utilizes a source of purge gas which is readily available in replaceable/disposable containers. it is completely safe to use even with highly inflammable liquids (e.g. gasoline fuel, etc.), and when used to measure oil in an engine sump, may be operated even when the engine is running. The device is also accurate at any altitude, and has a "check" mode for diagnostic purposes.

Other objects and advantages of the present invention will become apparent upon a reading of the detailed description of the preferred embodiment taken in conjunction with the accompanying drawings and the appended claims.

DETAILED DESCRIPTION OF THE DRAWINGS

FIG. 4 is an enlarged cross-sectional view of a portion of the apparatus of FIG. 3, shown in its actuated condition;

FIG. 5 is a fragmentary cross-sectional view taken along line 5—5 in FIG. 3.

FIG. 6 is an enlarged fragmentary cross-sectional view taken along line 6—6 in FIG. 5; and FIG. 7 is a rear elevational view of the liquid level apparatus of the present invention showing how it is connected to the liquid-containing tanks being metered.

DETAILED DESCRIPTION OF THE PREFERRED EMBODIMENT

Figure 1:
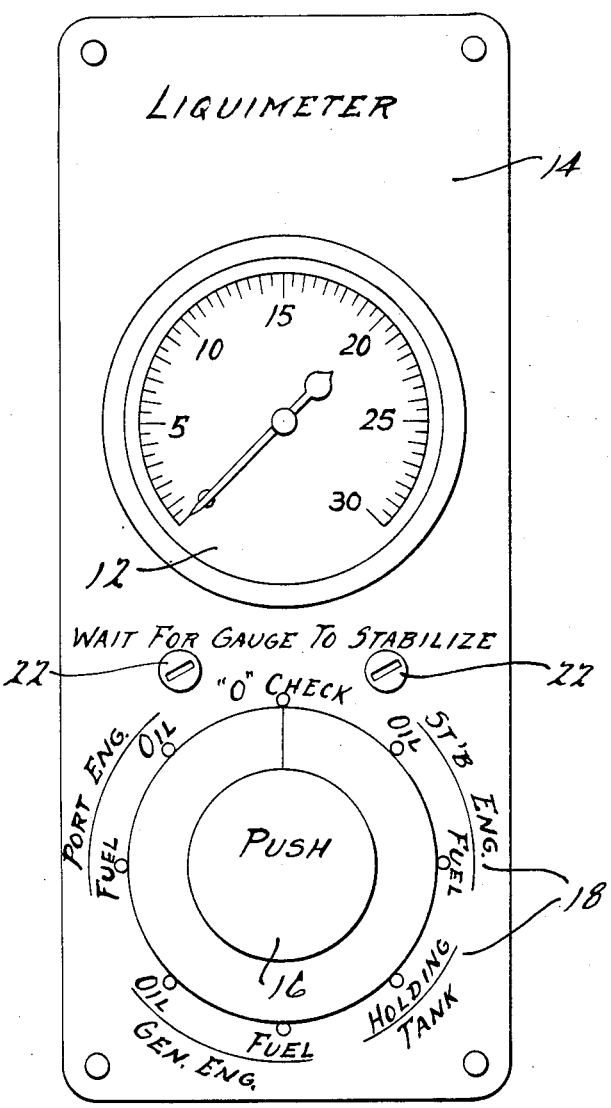
FIG. 1 is a front elevational view of a liquid level measuring apparatus embodying the principles of the present invention.
Figure 2:
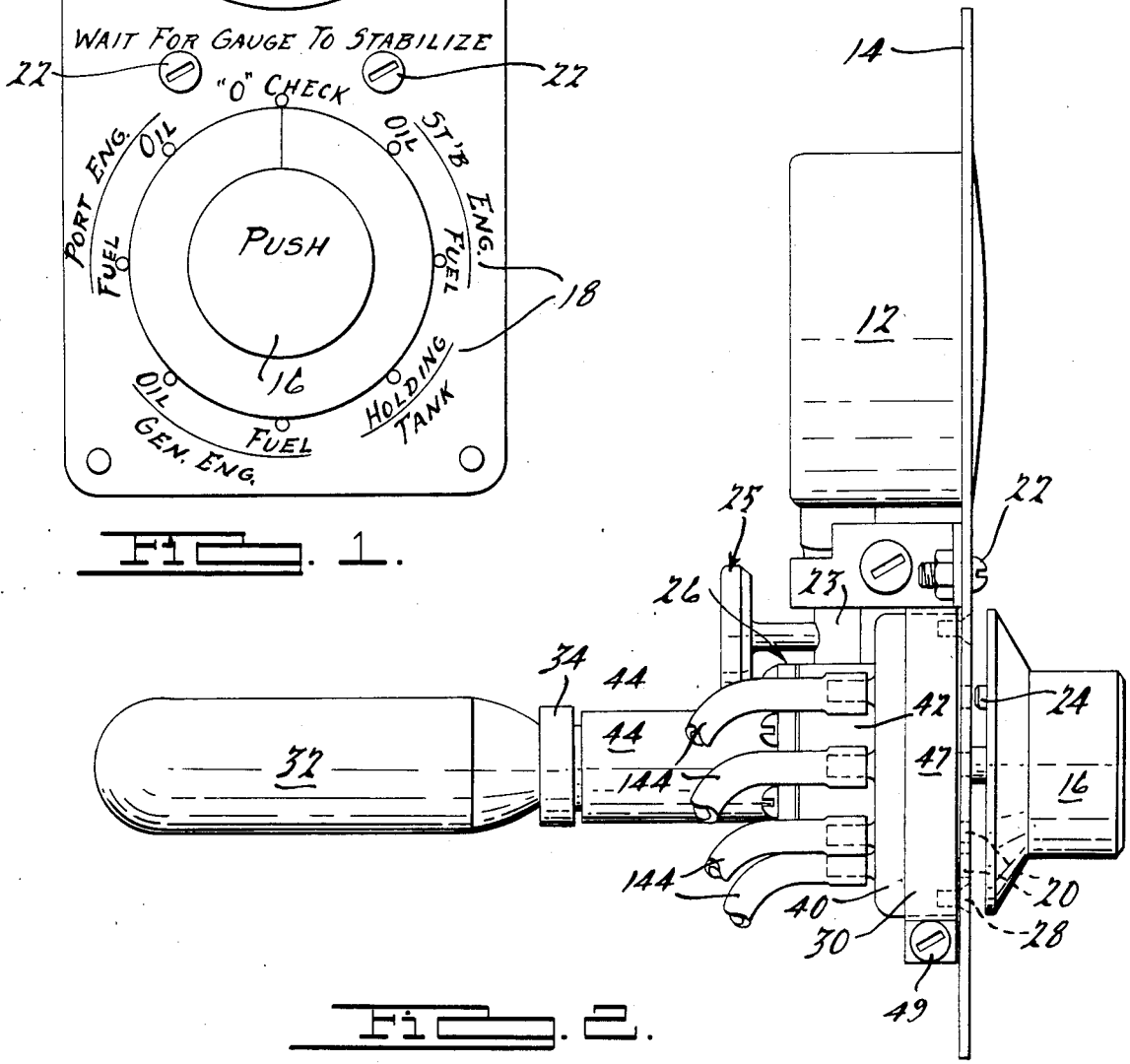
FIG. 2 is a side elevational view of the apparatus of FIG. 1.

Referring initially to FIGS. 1 and 2, the exemplary embodiment of the liquid level measuring apparatus disclosed herein generally comprises a conventional differential pressure gauge 12 mounted on a face plate 14 by a plurality of fasteners 22 and having an inlet nipple 23 connected to a multipiece valve housing assembly 26 secured to face plate 14 by fasteners 28, a replaceable/disposable pressurized source of gas in the form of a pressure bottle 32, an anti-siphon valve 25, and a manually operable selector knob 16. Face plate 14 has indicia 18 on its outer surface for identifying the different tanks which are monitored by the liquid measuring apparatus. A plurality of circumferentially arranged apertures 20 (FIG. 2) are provided in face plate 14, one for each item of indicia 18, for facilitating proper alignment of activating knob selector 16. To accomplish this, knob 16 has an appropriately located and sized pin 24 adapted to be aligned with and insertable into any one of apertures 20. The prevents the apparatus from being actuated when the selector knob is not in an operative position.

Housing assembly 26 comprises a front cover 40 (affixed to face plate 14 by fasteners 28, as noted), a body 42 having an outer cylindrical flange 43 overlying front cover 40 and sealed with respect thereto by an elastomeric seal 52, and a back cover 44 affixed to body 42 by a plurality of fasteners 74 with a flexible diaphragm 130 sealingly disposed therebetween. Additional sealing is provided by an elastomeric seal 76. The cross-sectional configurations of these major parts of housing assembly 26 are clearly shown in FIG. 3. Body 42 and front cover 40 may be formed of plastic, such as polypropelene; however back cover 44 should be formed of a stronger material, such as aluminum. A sheet metal clamping strap 47, tightened by a fastener 49, secures flange 43 and hence body 42 to front cover 40 and compression seal 52. Body 42 and front cover 40 are accurately located with respect to one another by a plurality of alignment pins 50. Front cover 40 has a forward protruding neck 46 having an axial bore 48 therethrough and with body 42 defines a central cavity 56 of the configuration shown. Back cover 44 in part defines a cavity 78 of the configuration shown. Purge gas, in general, flows from cavity 78 under the control of a control valve assembly 106 to a selector valve assembly 107, from which it is transmitted to the tank to be monitored.

Figure 3:
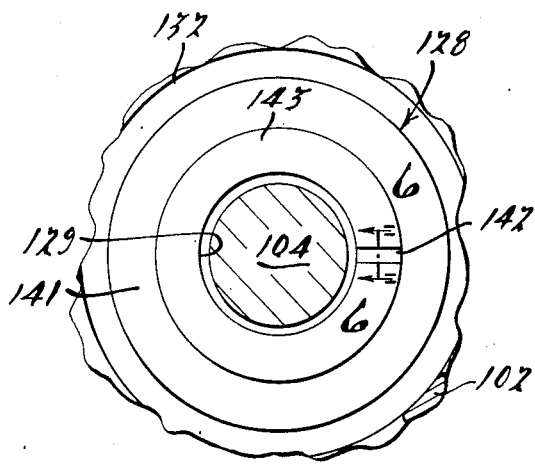
FIG. 3 is a vertical partial cross-sectional view of a portion of the apparatus of FIGS. 1 and 2, shown in its normal non-actuated condition.

Measuring or purge gas under pressure is supplied to the apparatus from a conventional gas bottle 32, such as a standard 25 gram $CO_2$ cartridge of the type used to inflate life vests. Other standard types of bottled inert gas may be used, such as Freon and nitrogen. In truck applications, the already available compressed air on the vehicle may be used in lieu of bottled gas. As best seen in FIG. 3, the bottle has a threaded end 84 which is threaded into a threaded bore 26 in back cover 44 until its lead seal is pierced by a point 90 on a metal lance 88 press fit into a bore 85 in cover 44 and having passageways 94 and 92 communicating with a bore 80 in cover 44. Sealing between the bottle and cover is effected by a metal adapter nut 34 (which can be different for different type bottles) and elastomeric seals 33 and 86. Adapter 34 has a threaded bore 36 so that prior to assembly it may be sealingly threaded on to the bottle. Gas flow from bottle 32 through bore 80 into cavity 78 is controlled by a conventional Dill-type valve 82 sealingly disposed within bore 80 and having an actuating plunger 83.

Gas flow from cavity 78 into cavity 56 is controlled by control valve assembly 106 (FIGS. 3 and 4), comprising a fixed annular metal valve seat 131 sealingly press fit in the front end of cover 44 and having a central flow opening 133, an axially movable annular elastomeric valve 136 cemented upon the enlarged end 140 of a generally cup-shaped support 128 which has a central flow opening 129 and is supported on diaphragm 130 between a metal piston 132 and a metal clamp 134, the latter parts being squeezed between enlarged end 140 and a shoulder 141 on support 128.

Shoulder 141 is provided on its front face with an annular flat valve surface 143 (FIGS. 4–6) having a radial notch 142 (as best seen in FIGS. 5 and 6, notch 142 can be a V-shaped scratch or groove having an included angle of approximately 60° and a depth of 0.005" to 0.010" in an apparatus having the approximate scale of FIGS. 1 and 2) which serves as a calibrated orifice when the apparatus is actuated. Valve surface 143 is adapted to engage an annular valve seat 138, formed of Teflon or the like, disposed on an actuating shaft assembly comprising a shaft 96 having a stem 110 rotatively disposed within bore 48 and sealed with respect thereto by an elastomeric seal 108 and an integral hub 116 having a central bore 109 and an annular recess 111 at the mouth of bore 109, bore 109 having an extension 104 press fit therein. Valve seat 138 is positioned on extension 104 adjacent seal 120, which seals seat 138 with respect to extension 104. A compression spring 102 extends between a shoulder on hub 116 and piston 132 to bias valve 136 to its normal closed position and the shaft assembly to its rightmost (non-actuated) position, as shown in FIG. 3. Knob 16 is affixed to the free end of stem 110 by means of a set screw 114.

Also disposed within cavity 56 and in sealing engagement with body 42 is selector valve assembly 107 comprising an annular elastomeric valve seat 126 (formed of closed cell neoprene sponge or the like) having a plurality of equally spaced holes 127 arranged in a circle concentric with the center rotational axis of shaft 96. In each hole 127 is disposed a boss 129 integrally formed with body 42 and projecting only partially into the hole. Each boss 129 has an outlet passageway 54 therethrough, and each passageway 54 communicates with a hose or tubing nipple 135 integral with and disposed on the back face of body 42, except for the top passageway 54 (the "check" position) which communicates directly with atmosphere via a vent 70.

As shown in FIG. 7, each nipple 135 (except the top one) is connected via conventional flexible lines or tubing 144, using standard fittings, to each of the liquid-containing tanks 146 to be monitored; for example, in the case of a boat: a starboard engine oil sump, a starboard engine fuel tank, a waste holding tank, a generator engine fuel tank, a port engine fuel tank, and a port engine oil sump, as illustrated. Other types and combinations of liquid storing tanks may of course be monitored with the apparatus of the present invention, depending on the application. If desired, nipples 135 can be originally fabricated with closed ends on passageways 54, which can later be "knocked out" when needed. This will assist in minimizing overall leakage. Any suitable tubing and fittings may be used, so long as it is leakproof and the tubing extends to or adjacent the bottom of the tank, so that purge gas sent through the tubing will be free to bubble up through the liquid in the tank from adjacent the bottom thereof. The tank being measured should be of the "vented" type, i.e. normally at atmospheric pressure.

Selection of the tank to monitor is accomplished by rotary selector valve assembly 107 which also comprises a circular metal valve disk 100 slidably but drivingly supported on hub 116 (hub 116 can be square in cross-section with valve 100 having a complimentarily shaped center hole) and having a plurality of holes 122 located within the confines of the center opening in seat 126 to permit purge gas to freely pass through the valve (to the right as shown), and a single port 124 disposed at the same radius as passageways 54 to direct the purge gas to the appropriate passageway 54, depending on the rotational position of knob 16. Valve 100 is maintained in seating relationship with seat 126 by means of a finger spring 98. The shaft assembly is axially movable by pushing knob 16 between the normal position shown in FIG. 3 to an actuating position to the left in which pin 24 extends into one of the apertures 22 and the free end 117 of extension 104 engages and actuates plunger 83 to open valve 82. Selector valve 100 slides with respect to hub 116 and finger spring 98 has sufficient play to permit this.

Pressure gauge 12 is in fluid communication with cavity 56 at all times via passagways 13 and 62 and a groove 63 on the end of nipple 23, the latter acting as a dampening orifice to protect the gauge. In order to prevent a negative pressure from occurring in the selected line of tubing, which could suck stored liquid up the tubing into the liquid measuring apparatus (which could occur if there was a significant temperature drop while the apparatus was unused), an anti-siphon valve 25 is placed in communication with passageway 13 and hence cavity 56. Valve 25 may be of any suitable type, and in the embodiment disclosed comprises a body 180 integral with nipple 23 and defining a valve chamber 182, a plurality of inlet openings 184 placing chamber 182 in communication with atmosphere and an outlet passageway 186 extending between chamber 182 and passageway 13. Chamber 182 is divided by an elastomeric diaphragm 188 having a relatively small opening 190 through the center thereof. Opening 190 is normally blocked by a projection 192 on body 180, however, if the pressure in cavity 96 ever drops below atmospheric pressure, diaphragm 188 will lift off projection 192 to permit air at atmospheric pressure to flow into the system and prevent the negative pressure condition from occurring. The unselected lines are closed, so there is no possibility of liquid contamination of the device from the unselected tanks.

To operate the apparatus the user first rotates selector knob 16 to select the desired tank, and then pushes the knob inwardly. This will cause extension 104 to actuate valve 82 and introduce purge gas under pressure from bottle 32 into cavity 78. This gas quickly reaches a pressure which acting on the effective area of valve assembly 106 creates a high enough force to collapse spring 102, thereby opening valve 136, closing valve 82, and closing the valve defined by seat 138 and grooved surface 143, as shown in FIG. 4. This action occurs very quickly and forcefully pushes the entire stem and knob assembly back to its normal outward position, as shown in FIG. 3.

During the period valve assembly 106 is moving from its FIG. 3 position to its FIG. 4 position a relatively small volume "blast" of relatively high pressure purge gas flows at a relatively high flow rate through opening 129, cavity 56, selector valve 106 and the tubing to the bottom of the tank being measured. This "blast" of gas substantially clears the tubing of any liquid which may be disposed therein and significantly shortens the time necessary to take a reading. When the valve assembly reaches its FIG. 4 position there will remain a predetermined volume of gas at a predetermined pressure in cavity 78 (which now extends all the way to the left face of diaphragm 130, as shown). This fixed volume of gas (much larger than the "blast" volume of gas) is thereafter "metered" at a relatively low and constant flow rate through the calibrated orifice defined by notch 142, from which it flows via the above-described path to the bottom of the tank being measured until the system has stabilized. The metered gas is of sufficient volume and pressure to maintain the line free of the liquid being measured, with the excess bubbling up through the liquid in the tank. Because the volume is always the same and because the orifice keeps the flow rate relatively low and constant, the device may be calibrated for consistent and accurate measurements, regardless of differences in line length.

The pressure of the gas existing in chamber 56 at the end of the metering phase is directly proportional to the level of the liquid in the tank being measured. Therefore a reading of gauge 12 (which will be the pressure differential between cavity 56 and the atmosphere) will give a number which can be directly converted to gallons, liters, inches of depth, etc., using a simple conversion table or chart. Because the device is based on pressure differential, it will operate accurately at all altitudes, provided the tank being monitored is also vented to atmosphere.

The volume of cavity 78, the effective area of valve 136 and the rate of spring 102 may be varied for any give application, and should be chosen so that sufficient gas volume and pressure is available to fully purge the specific line being used of the liquid being measured (i.e. the larger the line, the greater the volume, etc.). In applications requiring extremely long lines (e.g. in excess of 100 feet), the effective volume of cavity 78 may be increased by using an external reservoir connected in communication therewith. During the "blast" stage gas is metered by the relatively small clearance between extension 104 and opening 129. The dimensions of this clearance should be accurately maintained and should be chosen so that the pressure and flow rate are high enough to quickly clear the line, but not so high that the inertia of the ejected liquid is so high that it pulls a vacuum in the line which cannot be fully compensated for during the metering phase. It is believed that the volume of "blast" gas is in the order of magnitude of one-quarter to one-third of the volume of cavity 78.

Thus, observing the gauge at the initiation of a reading cycle the user would first see a relatively high pressure reading (caused by the "blast" of purge gas as it clears the lines) immediately followed by a lower pulsating pressure reading for several seconds (during the metering period) as the system stabilizes, and thereafter a steady pressure reading which is the liquid level measurement reading. In normal circumstances this reading will last for a relatively long period of time. If the system has not been used for a while, or if a problem is suspected, the "check" position should be selected. Although the purge gas is dumped to the atmosphere, because of the orifice created by notch 142 the "check" position functions as more than a simple check. Actuation of the device in this position will normally cause the gauge to show the high "blast" reading, followed by a zero reading. If the gauge does not show the normal "blast" reading, then the gas bottle probably needs replacement; and if the gauge fails to go to a zero reading then there is probably something wrong with the gauge. Certain malfunctions can also be detected while taking normal measurements. For example, if the gauge stays at a maximum pressure reading, the purge line to the tank is probably clogged; or if the final reading progressively drops then there may be a leak in the system. The device will work properly even if one of the lines is partially clogged (e.g. cold oil), but will take longer to reach the measurement reading. Whenever a reading is in doubt, the user can simply push the knob and retake the reading.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A method for measuring the amount of liquid in a tank having a communicating conduit for releasing a gas adjacent the bottom of said tank, said method comprising the steps of:
    (1) introducing a first volume of gas into said conduit at a relatively high rate of flow to substantially clear said conduit of liquid;
    (2) thereafter introducing into said conduit at a relatively low rate of flow a second fixed volume of gas in excess of an amount necessary to maintain said conduit free of liquid being measured, with sufficient excess gas to bubble up through the liquid in the tank, said fixed volume being the same each time the method is practiced; and
    (3) determining, at the end of step (2), the pressure in said conduit and converting it to a measurement of the amount of liquid in said tank.

2. A method for measuring the amount of liquid in a tank as claimed in claim 1, wherein said tank is vented to atmosphere and wherein the pressure determined in step (3) is the differential pressure with respect to atmospheric pressure.

3. A method for measuring the amount of liquid in a tank as claimed in claim 1, wherein step (3) takes place after completion of step (2).

4. A method for measuring the amount of liquid in a tank as claimed in claim 1, wherein said second volume of gas is introduced at a lower flow rate than said first volume.

5. A method for measuring the amount of liquid in a tank as claimed in claim 4, wherein said second volume of gas is introduced at a substantially constant flow rate.

6. A method for measuring the amount of liquid in a tank as claimed in claim 1, wherein said second volume of gas is introduced at a lower pressure than said first volume.

7. A method for measuring the amount of liquid in a tank as claimed in claim 1, wherein said first volume of gas is smaller than said second volume of gas.

8. A method for measuring the amount of liquid in a tank as claimed in claim 1, wherein said second volume of gas is introduced at a substantially constant flow rate.

9. An apparatus for measuring the amount of liquid in a tank, comprising:

(1) a conduit for releasing a gas adjacent the bottom of said tank;

(2) supply means for introducing a first volume of gas into said conduit at a relatively high rate of flow to substantially clear said conduit of liquid;

(3) means for introducing into said conduit at a relatively low rate of flow a second fixed volume of gas in excess of an amount necessary to maintain said conduit free of liquid being measured, with sufficient excess gas to bubble up through the liquid in the tank, said second fixed volume being the same each time the apparatus is actuated; and (4) sensing means for determining the pressure in said conduit so that it can be converted to a measurement of the amount of liquid in said tank.

10. An apparatus as claimed in claim 9, wherein said tank is vented to atmosphere and wherein the pressure determined in step (3) is the differential pressure with respect to atmospheric pressure.

11. An apparatus as claimed in claim 9, wherein said second volume of gas is introduced at a lower flow rate than said first volume.

12. An apparatus as claimed in claim 11, wherein said second volume of gas is introduced at a substantially constant flow rate.

13. An apparatus as claimed in claim 9, wherein said second volume of gas is introduced at a lower pressure than said first volume.

14. An apparatus as claimed in claim 9, wherein said first volume of gas is introduced at a substantially constant flow rate.

15. An apparatus as claimed in claim 9, wherein said second volume of gas is introduced at a substantially constant flow rate.

16. An apparatus as claimed in claim 9, wherein said supply means comprises a replaceable and disposable gas cartridge.

17. An apparatus as claimed in claim 16, wherein said gas is carbon dioxide.

18. An apparatus as claimed in claim 9, further comprising anti-siphon means for preventing a vacuum being drawn in said conduit.

19. An apparatus as claimed in claim 9, wherein said sensing means is a differential pressure gauge.

20. An apparatus as claimed in claim 19, wherein said tank is vented to atmosphere.

21. An apparatus for measuring the amount of liquid in a tank, comprising:
   (1) a source of gas under pressure;
   (2) a reservoir of fixed volume;
   (3) a first passageway placing said reservoir in communication with said source of gas under pressure;
   (4) a valve in said first passageway for controlling gas flow therethrough;
   (5) a second passageway for placing said reservoir in communication with the bottom of a tank to be measured;
   (6) a calibrated orifice in said second passageway;
   (7) actuating means for opening said valve to permit gas under pressure to flow a relatively high rate into said reservoir and for thereafter closing said first valve and causing a fixed volume of gas to flow at a relatively low controlled rate from said reservoir through said calibrated orifice to the bottom of said tank; and
   (8) means for indicating the pressure of said gas downstream of said orifice so that it can be converted to a measurement of the amount of liquid in said tank.

22. An apparatus for measuring the amount of liquid in a tank, comprising:
   (1) a source of gas under pressure;
   (2) a reservoir of fixed volume;
   (3) a first passageway placing said reservoir in communication with said source of gas under pressure;
   (4) a first valve in said first passageway for controlling gas flow therethrough;
   (5) a second passageway for placing said reservoir in communication with the bottom of a tank to be measured;
   (6) a second valve in said second passageway for controlling gas flow therethrough;
   (7) a calibrated orifice in said second passageway bypassing said second valve;
   (8) actuating means for opening said first valve to permit gas under pressure to flow at a relatively high rate initially into said reservoir and through said reservoir and said second passageway to the bottom of said tank, and for thereafter closing said first and second valves to permit the fixed volume of gas in said reservoir to flow at a relatively low controlled rate through said calibrated orifice to the bottom of said tank; and
   (9) means for indicating the pressure of said gas downstream of said orifice.

23. An apparatus as claimed in claim 22, wherein said reservoir has a movable wall and is expandable to said fixed volume.

24. An apparatus as claimed in claim 23, wherein said second valve is actuated by said movable wall.

25. An apparatus as claimed in claim 23, wherein said movable wall is actuated by said gas passing through said first valve.

26. An apparatus as claimed in claim 22, further comprising means restricting the flow of gas to the bottom of the tank prior to said closing of said second valve.

27. An apparatus as claimed in claim 22, further comprising a selector valve connected in fluid communication between said second passageway and a plurality of liquid-containing tanks, said selector valve being selectively operable to place said second passageway in fluid communication with any one of said tanks in order to measure the amount of liquid therein.

28. An apparatus as claimed in claim 27, wherein said selector valve is manually rotatable to any one of its selective positions.

29. An apparatus as claimed in claim 28, wherein said selector valve is also axially actuatable to cause said first valve to open.

30. An apparatus for measuring the amount of liquid in a tank, comprising:
   (1) a source of gas under pressure;
   (2) a reservoir of fixed volume;
   (3) a first passageway placing said reservoir in communication with said source of gas under pressure;
   (4) a first valve in said first passageway for controlling gas flow therethrough;
   (5) a second passageway for placing said reservoir in communication with the bottom of a tank to be measured;
   (6) a second valve in said second passageway for controlling gas flow therethrough, said second valve comprising a pair of engaging valve surfaces;

(7) a calibrated orifice in said second passageway bypassing said second valve, said orifice comprising a groove on one of said valve surfaces;

(8) actuating means for opening said first valve to permit gas under pressure to flow initially into said reservoir and through said reservoir and said second passageway to the bottom of said tank, and for thereafter closing said first and second valves to permit the volume of gas in said reservoir to flow at a controlled rate through said calibrated orifice to the bottom of said tank; and (9) means for indicating the pressure of said gas downstream of said orifice.

* * * * *

UNITED STATES PATENT AND TRADEMARK OFFICE
CERTIFICATE OF CORRECTION

PATENT NO. : 4,665,746
DATED : May 19, 1987
INVENTOR(S) : William L. Sheppard

It is certified that error appears in the above-identified patent and that said Letters Patent is hereby corrected as shown below:

On the title page Item (76) inventor's name should read
-- William L. Sheppard --.

Column 1, line 36, "it" should read -- It --.
Column 2, line 22, "The" should read -- This --.

Signed and Sealed this

Nineteenth Day of January, 1988

Attest:

DONALD J. QUIGG

Attesting Officer

Commissioner of Patents and Trademarks